United States Patent [19]
Stewart et al.

[11] Patent Number: 4,746,795
[45] Date of Patent: May 24, 1988

[54] METHOD OF AND APPARATUS FOR ANALYZING FLUID FLOWS WITHIN HOLLOW BODIES

[75] Inventors: Peter A. E. Stewart, Bristol; Michael R. Hawkesworth, Birmingham; Roger C. Witcomb, Bristol, all of England

[73] Assignee: Rolls-Royce plc, London, England

[21] Appl. No.: 5,313

[22] Filed: Jan. 16, 1987

Related U.S. Application Data

[63] Continuation of Ser. No. 318,939, Nov. 6, 1981.

[30] Foreign Application Priority Data

Nov. 15, 1980 [GB] United Kingdom ................ 8036725

[51] Int. Cl.$^4$ .......................... G01T 1/16; G21H 5/02
[52] U.S. Cl. ................................. 250/303; 250/356.1; 250/308; 250/363 S
[58] Field of Search ................ 250/363 SA, 308, 303, 250/356.2

[56] References Cited

U.S. PATENT DOCUMENTS 4,388,520  7/1982  Stewart .............................. 250/356

FOREIGN PATENT DOCUMENTS 2456958  12/1980  France .
2031142   4/1980  United Kingdom .

OTHER PUBLICATIONS

Chesler et al, "Three-Dimensional Reconstruction . . . ", *Journal of Nuclear Medicine*, Jan. 1975, pp. 80–82.
IEEE Transactions on Instrumentation and Measurement, Microprocessor-Based Flow Measurement Using a Positron Active Tracer, Hannu Heusala and Risto Myllyla (1979), vol. 28, No. 4, pp. 321–324.
IEEE Transactions on Nuclear Science, Corrections for Attenuation, Scattered Radiation, and Random Coincidences in a Ring Detector Positron Emission Transaxial Tomograph, M. Bergstrom et al, Feb. 1980, vol. 27, No. 1, pp. 549–554.
"Positron-Emission Tomography" by Ter-Pogossian, et al., *Scientific America*, vol. 243, No. 4 (Oct. 1980), pp. 141–155.
"The Cern Proportional Chamber Positron Camera", by A. Jeavons, *European Organization for Nuclear Research*, Cern-EP/79-59, Jun. 15, 1979.
"ECAT: A New Computerized Tomographic Imaging System for Positrion-Emitting Radiopharmaceuticals", by Michael E. Phelps, *Journal of Nuclear Medicine* 19, 1978, pp. 635–647.
"The Measurement of Flow of Liquids and Gases Using Radioactive Isotopes", by C. G. Clayton, *Journal of British Nuclear Energy Society*, 1964, pp. 252–268.
"The Development of the Rutherford Laboratory MWPC Position Camera", by J. E. Bateman, et al., *Rutherford and Appleton Laboratories*, 1980.
"Pulsed Neutron Measurement of Single and Two-Phase Liquid Flow", by P . Kehler, *IEEE Trans. on Nucl. Science*, vol. 26, No. 1, Feb. 1979, pp. 1627–1631.
"Precise Tracer Measurements of Liquid and Gas Flow" by Colin G. Clayton, *NUCLEON*, Jul. 1960, pp. 96–100.

*Primary Examiner*—Craig E. Church
*Assistant Examiner*—Jack I. Berman
*Attorney, Agent, or Firm*—Parkhurst & Oliff

[57] ABSTRACT

A representation of oil flow in a gas turbine engine is obtained by injecting a compatible radioactive isotope label into the engine oil flow and detecting the radiation emitted from within the body with detectors mounted outside the body to produce signals representative of the quantity and direction of the radiation; the detector output signals are compensated for attenuation on passing through the engine in accordance with attenuation signals derived from a representation of the spatial distribution of the engine and of its materials, and signals from non-viable directions are discounted. The compensated detector output signals are used to generate a number of focal-plane tomograms from which an image in a desired plane may be re-constructed. The image may be formed on a background of the engine in the relevant plane generated from the representation thereof. The injection of radio-active label and the detector output signals may be pulsed to produce a strobed image from which velocity measurements can be obtained.

22 Claims, 2 Drawing Sheets

METHOD OF AND APPARATUS FOR ANALYZING FLUID FLOWS WITHIN HOLLOW BODIES

This is a continuation of application Ser. No. 318,939, filed Nov. 6, 1981.

The present invention relates to a method of, and apparatus for, analysing fluid flows inside hollow bodies, and has particular application for metallic hollow bodies such as, for example, engines, test rigs, and pipes, but may also find applications in the medical field. The invention is particularly applicable to liquid or two phase flows, but can also be applied to gas flows.

A technique, known as pulsed neutron activation, is used for determining mass flow in pipes. In this technique a liquid flowing in a pipe is irradiated by a neutron beam to produce a radio-active isotope in the liquid. A detector positioned downstream of the irradiation point, detects the quantity of radioactivity in the liquid as it passes, and from this information the velocity and density of the liquid can be calculated. (Reference—paper by P. Kehler entitled "Pulsed Activation Calibration Technique" presented at the seventh Water Reactor Safety Research Information Meeting in Gaithersburg, November 1979). This technique, however, provides information only in one dimension.

Also the use of X-Y position sensitive, or two-dimensional (2D) radiation "cameras" to trace the distribution of radioisotope-labelled liquids introduced into the human body is now a well-established aid to the diagnosis of certain medical conditions. Two methods may be identified based, respectively, on gamma-emitting and positron-emitting isotopes. These are, single-photon imaging using a gamma camera, and positron emission tomography (PET) using positron camera. A gamma camera is composed of a single 2D detector and associated electronics for image acquisition, processing and display, and uses a heavy metal collimator and pulse-height selection to discriminate true image forming radiation from background scattered radiation. A positron tomography camera needs a 2D detector on each side of the subject and a small computer to receive, construct, and display the image, in which the desired radiation is discriminated from background by the acceptance of only the coincident events in the detectors produced by the two (511 kev) photons emitted in exactly opposite directions when, as it comes to rest, an emitted positron collides with an electron and the two anihilate each other.

With the PET technique the displayed image is computed from the recorded information for a selected plane in the subject. Only events due to decays in this plane appear in focus and, such is the power of the technique, decays in other planes appear as a more or less uniform background. Moreover, as any of the planes between the detectors may be selected, this technique inherently yields three-dimensional information about its subject.

Until now, however, there has been no method or apparatus available to make fluid flow studies possible in engineering applications in which the requirements are much more rigorous.

It is clear that the requirements for using these analytical techniques in engineering investigations are significantly different to those for use in medical science. It is not, therefore, possible to take an established medical diagnostic system and to use it, without modification, to visualise a fluid flow, for example, an oil flow in a gas turbine engine, particularly during operation of the engine.

The problems to be solved in engineering applications are, inter alia, that the radiation has to be detectable through several centimeters of metal rather than human tissue, which requires high energy and activity in the isotope. At the same time environmental considerations dictate that the radioactivity should not be a hazard to personnel in the vicinity.

Also in engineering the requirement is to visualise the actual movement of the flow, for example, the path taken by the oil lubricating a bearing of a machine, or the leakage flow of oil around seals or piston rings. The temporal resolution of the system is thus as significant a factor as the spatial resolution.

Further, it is essential to know the relationship between the flow and the surrounding material of the test vehicle, e.g. bearing pipes and seals if meaningful measurements are to be obtained from the test.

An object of the present invention is to provide a method of, and apparatus for, producing information about the spatial distribution in three dimensions of gases, liquids, or even two-phase flows, inside hollow bodies, using a radio-active tracer technique, and for presenting a visual image from the information in a form which enables measurements of the flow in different planes to be made.

According to the present invention a method of producing a representation of a fluid flow inside a hollow body comprises the following steps:

injecting into the fluid a quantity of a radio-active isotope label which is compatible with the fluid, detecting radiation emitted due to the radio-active decay of the isotope by detection apparatus located outside the body and which produces output signals responsive to the detected radiation, generating a representation of the spatial distribution of the structure of the body which surrounds the fluid flow and of the material from which it is made, producing from said representation attenuation signals representative of the attenuation of the radiation passing through the body, adjusting the output signals from the detection apparatus in dependence upon the attenuation signals to compensate for the attenuation of the radiation and providing adjusted output signals, and producing from said adjusted output signals a representation of the fluid flow inside the body.

The resulting representation of the fluid flow is preferably produced by a computer in the form of a plurality of tomograms, any one of which may be displayed on a screen. The representation may be further refined by reconstructing the tomographic images using an image reconstruction algorithm in order that cross-sections through any plane of the fluid flow can be visualised. The display on the screen may also include a visual representation of structure of the body derived from said representation of the spatial distribution of the structure of the body, whereby the spatial distribution of the fluid flow may be seen in relation to that of the body structure.

The representation of the spatial distribution of the structure of the body which surrounds the fluid flow is preferably made by a computer visualisation technique and stored in a storage device which is scanned by the computer which produces the tomogram in order to obtain the adjusted signals for use in producing the tomogram.

In a modification to the invention the isotope is injected into the fluid flow inside the body in a series of pulses and the signals coming from the detection apparatus are gated, either before or after the computing step, at the frequency of the pulses to produce a stroboscopic effect in the resulting images.

The isotope label is preferably injected into the hollow body in a carrier fluid which must also be compatible with the fluid being analysed.

The invention also includes apparatus for producing a representation of a fluid flow inside a hollow body comprising a source of a radio-active isotope label which is compatible with the fluid flow, means for injecting a quantity of the radio-active isotope label into the fluid flow within the body, detection apparatus mounted around the outside of the body for detecting radiation emitted through the body and capable of producing output signals representative of the quantity of such radiation and its direction, means for providing a representation of the spatial distribution of the structure of the body which surrounds the fluid flow and of the materials from which it is made, means for generating attenuation signals representative of the attenuation of the radiation passing through the body, means for receiving the attenuation signals and the output signals of the detection apparatus and for adjusting said output signals from the detection apparatus in dependence upon the value of attenuation signals to produce adjusted output signals compensated for the attenuation of the radiation, and, means for receiving the adjusted output signals and for producing a representation of the fluid flow inside the body.

The source of the radio-active isotope may be means for activating on site a carrier fluid compatible with the fluid being investigated by a charged particle activation technique, the carrier fluid being injected directly into the fluid flow within the body, or more conveniently, the source may be an isotope generator which stores a relatively short-lived daughter isotope which is an easily separated $\beta$-decay product of a long-lived parent isotope which, in turn, may be produced by charged particle bombardment of a target material. The daughter isotope is eluted from the parent isotope using a carrier fluid which is compatible with the fluid being investigated.

The detectors may be any suitable form of gamma or positron camera but preferably they take the form of positron cameras of the type utilising multi-wire proportional counters made by the Science Research Council at the Rutherford Laboratory in England.

The provision of the representation of the spatial distribution of the structure of the body and its materials, the generation of the attenuation signals and the adjusting of the output signals is preferably all performed by a suitably programmed computer or computers.

Examples of the invention will now be described in greater detail with reference to the accompanying drawings in which.

Figure 1:
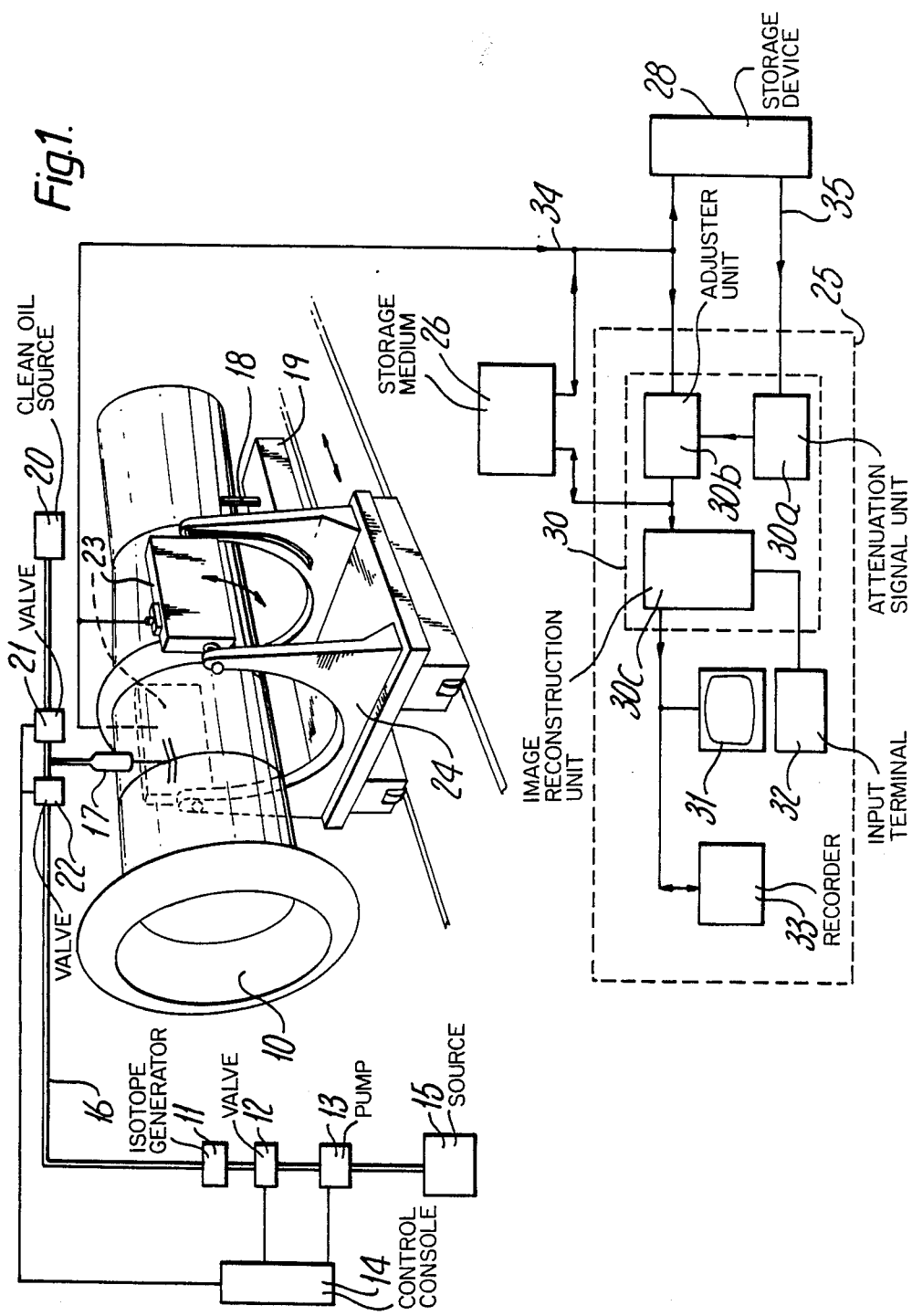
FIG. 1 illustrates diagrammatically the layout of the apparatus used in analysing liquid flows within a gas turbine engine.

Referring now to FIG. 1 there is shown a gas turbine engine 10 of which part of the oil system is being analysed. The apparatus includes an isotope generator 11 with a valve 12 and pump 13 controlled from a control console 14 for controlling the flow of a suitable carrier fluid. The carrier fluid is supplied from a source 15 and, after being labelled with the isotope, passes via a line 16 to a small bore tube or hypodermic injector 17 mounted on the engine to inject the carrier fluid into the engine oil system at a precise location.

The engine oil which has been labelled is collected via a drain line 18 in a sump 19. A purging system is provided which includes a source 20 of clean oil, which is supplied to the engine via a valve 21, while a valve 22 shuts off any further supplies of carrier fluid.

Two multi-wire proportional counters 23 are mounted on a carrier 24 which straddles the engine, and which is movable axially along the engine. The counters are movable relative to the carriage to pivot about the engine and movable with the carriage along the engine so that the counters can be positioned in the best position to receive the radiation produced by the radioactive decay of the isotope taking place during the test.

The signals produced by the counters may be passed directly to a signal processing system 25 to produce a real-time display of the oil flow, or, as is preferred, may be recorded and stored on a storage medium 26 such as a magnetic tape or disc for subsequent processing.

As a further source of input to the signal processing system 25 a storage device 28 is provided in which is stored a representation of the spatial distribution of the structure of the engine and of the materials from which it is made. As described hereinafter this enables an adjustment to be made to the detector output signals to take account of radiation which has been attenuated by the engine.

The various parts of the layout of FIG. 1 will now be described in more detail.

Isotope Generation

Because short-lived isotope labels are required it is impractical to consider remote production of the isotope at a nuclear reactor and subsequent transportation to a test site. It is also a limitation on the system if the test has to be carried out at a reactor site.

Two methods are available:

One is to use a portable particle accelerator such as a Cyclotron and directly inject the isotope into the equipment being tested. This solution is described in our United Kingdom patent application No. 8013834 in relation to a gas flow analysis technique.

The second, and preferred, method for liquid flow analysis is to produce a relatively long-lived parent isotope which can easily be transported in an isotope generator and which produces an easily separated $\beta$-decay product of a more appropriate half-life and which is a more suitable label.

The parent isotope is produced by bombardment of a suitable target using nuclear particles produced, for example, in a cyclotron, and is then transferred to an isotope generator for storage and transportation.

In the isotope generator, shown at 11 in FIG. 1, the parent isotope is absorbed in an appropriate chemical form on absorbent material, e.g. an ion-exchange resin held in a suitably shielded and valved tube. The parent isotope gradually decays to its daughter isotope which is extracted, when needed, by the carrier fluid which is pumped through the tube to flush the isotope from the resin. Because the $\beta$-decay causes a chemical change from parent to daughter isotope the daughter can be separated without disturbing the parent.

A number of isotopes have been identified as suitable for use and the following table gives details of their production. The two most promising at present are $^{68}Ga(\beta+)$ and $^{140}Pr(\beta+)$.

| Isotope | Half-life | Type and Energy of emission | Production reactions |
|---|---|---|---|
| $^{10}C$ | 19.3 s | $\beta+$ 1.9 MeV $\gamma$ 0.82 MeV (99%) | $^{10}B(p,n)$ |
| $^{11}C$ | 20.3 min | $\beta+$ 1.0 MeV, no $\gamma$ | $^{11}B(p,n)$ $^{14}N(p,\alpha)$ |
| $^{13}N$ | 9.96 min | $\beta+$ 1.2 MeV, no $\gamma$ | $^{12}C(d,n)$ |
| $^{15}O$ | 122 s | $\beta+$ 1.7 MeV, no $\gamma$ | $^{14}N(d,n)$ $^{16}O(^{3}He, \alpha)$ |
| $^{18}F$ | 110 min | $\beta+$ 0.6 MeV, no $\gamma$ | $^{20}Ne(d,\alpha)$ |
| $^{45}Ti$ | 3.08 h | $\beta+$ 1.0 MeV, few $\gamma$ s | $^{45}Sc(p,n)$ |
| $^{68}Ga$ | 68.3 min | $\beta+$ 1.9 MeV, few $\gamma$ s | $^{69}Ga(p,2n)^{68}Ge$ $^{68}Ge \xrightarrow{280d} {}^{68}Ga$ |
| $^{99m}Tc$ | 6.0 h | $\gamma$ 140 KeV (90%) | $^{98}Mo(n,\gamma)^{99}Mo$ $^{99}Mo \xrightarrow{66h} {}^{99m}Tc$ |
| $^{140}Pr$ | 3.4 min | $\beta+$ 2,3 MeV, few $\gamma$ s | $^{141}Pr(p,2n)^{140}NdPr$ $^{140}Nd \xrightarrow{3.4d} {}^{140}Pr$ |

Suitability of the isotopes to be used as labels depends on the following criteria being satisfied:

(1) The half-life of the isotope must be relatively short. A minimum practical limit on the half-life is about 10 seconds, and where a gaseous fluid is being investigated, which may be allowed to escape into the atmosphere, half-lives of this order should be used to avoid environmental pollution. Where a liquid is being investigated, which can be collected and stored, much longer lived isotopes can be used. The term relatively short should, therefore, be taken to cover the range of half-lives of between 10 seconds and about one week.

(2) The energy level of the emitted radiation must be high enough to allow it to penetrate the walls of the test vehicle, but low enough to allow efficient detection by the detectors mounted around the outside of the test vehicle. A minimum radiation energy would be around 100 Kev but the preferred range is 200 Kev to 600 Kev.

(3) The type of radiation emitted is important. Many radio-active decays involve emission of gamma radiation and/or positrons. Because of the greater resolution of the coincidence counting positron camera over the gamma camera, the positron camera is more suitable for work involving liquid flow analysis. Also the range of the positron in liquid before annihilation is a fraction of a centimeter so that the origin of a positron-emitting decay can be more accurately determined in liquids compared to gas flow analysis. Hence an important requirement in a practical liquid flow analysis system is that the isotope label is a positron-emitting isotope.

(4) Neither the isotope label nor the carrier fluid must have any significant detrimental reaction with the component parts of, or the fluid within the test vehicle, and its density must be compatible with the fluid under test.

(5) The activity requirement of the isotope label, i.e. the number of emissions per unit time, depend to a large extent on whether liquid or gaseous fluids are to be examined, on the speed of the flow within the test vehicle, on the duration of the test, on the material thickness through which the radiation must pass in order to reach the detectors, and on the half-life of the chosen isotope. Initial tests have shown that the total activity required in a typical test to visualise a liquid flowing at 30 meters per second through 50 mm of steel would be 10 Curies (Ci). Activities of this high level are required to give the improved spatial resolution for engineering applications, and are far greater than normal medical practice and thus pose their own problems.

The selection of a suitable isotope for any given test will always be a compromise between the above requirements.

Radiation Detection

The detectors 23 are multi-wire proportional counters (MWPCs). Such detectors are known and are not described in detail here. However, for reference a description of the construction and operation of a suitable one of these detectors known as a positron sensitive neutral particle sensor is given in the specification to UK patent application No. 7827804 and published under No. 2,000,632A.

The positrons emitted by the isotope label annihilate electrons in the oil and give off photons simultaneously in opposite directions. The detectors are placed on opposite sides of the engine so as to lie in positions in which they intercept the oppositely directed photons. The detectors provide the co-ordinates of the arriving photons, and by arranging for the detectors' electrical circuitry to produce output signals only in response to coincident arrivals of photons, the output signals are made representative of the directions of annihilation-product photons. The directionally representative output signals are processed to produce a plurality of tomograms, from which may be reconstructed an image in any desired plane.

A typical camera exposure for a good image is 1mCi-sec per basic subject element (1 ml). Throughout the photon energy range of relevance, attenuation in both tissue and metal is primarily by the same process-Compton scattering. Thus in engineering radioisotope imaging, for the same equivalent subject thickness, isotope-detector separation, and imaging resolution, the same exposure as used in medical techniques will be necessary. Hence, a stable and uniform stream line with a labelled cross-section of 1 $cm^2$ and an average specific activity of 1 Ci/ml will have to be maintained for $10^3$ sec to be detected.

The total activity to be injected into the flow, therefore, will also depend upon the velocity of the flow. Since the detector separation will be greater for a gas turbine engine than in medical engineering, it will be necessary in such applications of the present technique to have detectors with much larger area, or isotopes of higher activity. At present it is possible to make MWPCs in panels of 50 cm $\times$ 100 cm which should enable two only to be used. For greater resolution, however, a cylindrical array may be made to surround completely the area under investigation.

It should be noted, however, that as positrons annihilate electrons predominantly at the end of their range, which is only a fraction of a centimeter in liquids, the above technique will, in general, be used for liquid flow studies, and a gamma camera mainly for those studies of gas flows for which current methods are unsuitable.

Image Reconstruction

The image reconstruction is performed by the image processing system 25 which includes a computer 30, and a visual display unit 31. Instructions are passed to the computer by a user terminal 32 and a recorder 33 is provided to record the images.

The basic algorithms required for image reconstruction using a PET technique are now well established in the medical field and need not be described in detail here. A typical algorithm is the ART algorithm which is described in an article entitled "A Tutorial on ART (Algebraic Reconstruction Techniques)" in the transactions on Nuclear Science of the IEEE (Institute of Electrical and Electronic Engineers) Volume NS-21 dated June 1974 pp. 78–93.

The computer receives the detector output signals and generates a number of focal-plane tomograms covering the volume of interest within the test vehicle. The normal computer calculation is modified to make allowance for the amount of metal, or other material, through which the photons have passed. In order to enable this to be done a stored representation of the spatial distribution of the structure of the engine and of the material from which it is made is provided.

The representation is stored in storage device 28 which is an INTELLECT computer and may be regarded as part of the image processing unit. The representation is built up in the computer's memory using a standard bit-pad with its associated program, or alternatively, a light pen or another input device may be used.

In this way a representation is built up of all of the material of the engine surrounding the volume of the oil system being investigated, and each piece of material is coded as to its radiation attenuation properties.

The basic steps in building up such a representation are as follows:

1. The computer memory is mapped onto a number of small volume elements (known as voxels) which comprise an imaginary volume of space representative of the volume of the engine containing the part of the oil system being investigated. Such techniques are well known in computer representations.
2. In each memory element with which a respective voxel is associated a code, e.g. zero, is stored to represent empty space.
3. From a drawing of the engine, an outline of a metal part, e.g. a casing, is drawn on a bit pad and in those memory elements associated with voxels which the part occupies, a code representing the part's attenuation properties is stored.

If part of the engine is symmetrical about the engine axis, it may usefully be drawn in line form only and the computer can be instructed to rotate the outline through 360° to generate a volume of revolution and to code the memory elements associated with the voxels occupied by this volume according to the part's attenuation properties.

4. The remaining parts of the engine can be fed in in this way and stored in appropriate code form to complete the representation. If desired, a display of the representation can be produced as it is entered, and materials of different attenuation properties can be arranged to shown up in different colours on the display.

The output signals from the detectors 23 are each representative of the particular direction of a single detected coincident photon pair. Each signal is passed via line 34 to the computer 30 and to the engine representation computer 28.

The computer 30 may be considered as three separate functional units: an attenuation signal unit 30a, an adjuster unit 30b and tomogram generation and image reconstruction unit 30c. For each direction signal passed from the detectors 23 to the computer 30 and the computer 28, the computer 28 passes to the computer 30 via line 35 the codes stored in the memory elements associated with the voxels through which passes the direction represented by the signal. The computer 30, functioning as attenuation signal unit 30a, sums the codes received from the computer 28 to produce an attenuation signal representative of the average attenuation that would be experienced by photon pairs travelling in the direction of the detector output signal.

However, before passing the codes to the computer 30, the computer 28 first detects whether the direction represented by a signal passes through a possible oil location in the engine: if so, the codes are passed as previously described, but if not (e.g. if the detected coincident "pair" of photons are not in fact generated from the same electron-positron annihilation) zero codes are passed instead.

The computer 30 then, functioning as adjuster unit 30b, adjusts the detector output signal received on line 34 to compensate for attenuation by combining with it an attenuation compensation factor in the form of the magnitude of the attenuation signal to produce an adjusted detector output signal.

The computer then, functioning as tomogram generation and image reconstruction unit 30c, processes the adjusted detector output signals (adding the attenuation compensation factors for each particular direction to derive a total for the compensated, detected radioactivity in that direction) in accordance with a tomogram reconstruction algorithm, e.g. the ART algorithm referred to above, to generate a number of focal plane tomograms. These tomograms may be stored on the recorder 33.

It will be appreciated that these tomograms are of higher quality than would otherwise be achieved due to the combined effects of (i) detector output signal adjustment to compensate for attenuation, and (ii) rejection of the contribution of detector output signals which do not represent viable radiation directions.

In response to a user request via input terminal 32 the computer 30 reconstructs, in a manner well known in the art, from the focal plane tomograms an image in a user-specified plane and displays it on the visual display unit 31. This image may also be stored on the recorder 33.

In some applications it may be sufficient in the present invention to display one or more tomograms only, since these are of higher resolution than has before been achieved, without necessarily having to re-construct an image therefrom.

The representation of the engine oil flow displayed on visual display unit 31 may be further improved by superimposing on it an image of the engine (e.g. from the representation thereof stored in the computer 28) in the plane being displayed.

Figure 2:
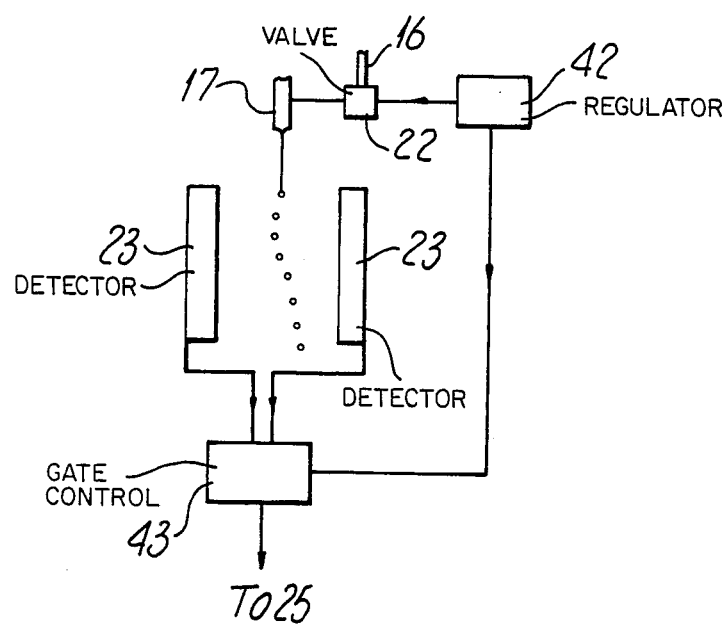
FIG. 2 shows diagramatically a modification to the layout of FIG. 1 which allows a stroboscopic analysis of the fluid flow to be made.

Referring now to FIG. 2 there is shown an arrangement for producing a stroboscopic effect in the representation produced in the system of FIG. 1. The valve 22 in the line 16 supplying the carrier fluid from the pump is vibrated by means of a solenoid or other suitable means (not shown) to produce a pulsing flow at the injector 17. Control over the frequency of the pulsing is provided by a regulator 42 which also sends a signal to a gate control 43 in the signal line between the detectors 23 and the image processing unit 25. By pulsing the valve 22 at a frequency which is a multiple of the frequency of opening and closing of the gate control 43, the representation displayed on the visual display unit 31 can be strobed so as to enable velocity measurement of the oil flow to be made.

We claim:

1. A method of reproducing a representation of the flow path of a liquid flowing inside a hollow inorganic body comprising the steps of:

injecting into the liquid a quantity of a positron radioactive isotope label which has no detrimental reaction with the liquid or body structure;

detecting radiation emitted due to the annihilation of electrons by the positrons emitted by the isotope label, as it is carried with the liquid along the liquid flow path, by fixed detector apparatuses positioned at locations outside the body and which produce output signals responsive to the detected radiation, including attentuated radiation, for producing a first representation indicative of the flow of the liquid;

generating a second representation indicative of the spatial distribution of the structure of the body which surrounds the liquid flow and of the materials from which each major part of it is constructed, the second representation including a plurality of codes representing the differing attenuating properties at a plurality of locations within the body;

producing from said second representation attenuating effect information relating to the attenuation of the radiation as it passes through locations having differing attenuating properties;

generating attenuation compensation factors from the attenuating effect information; and combining said detector output signals with said attenuation compensation factors to produce adjusted output signals representing the flow path of the liquid corrected for the attenuating effects of the materials of, which the inorganic body is constructed.

2. A method as claimed in claim 1 and in which the production of the representation of the flow path includes the steps of deriving from said adjusted output signals a plurality of tomograms and selectively displaying them on a visual display unit.

3. A method as claimed in claim 2 and comprising the further step of reconstructing the tomograms using an image reconstruction algorithm and selectively displaying reconstructed images in various different planes through the flow path on the visual display unit.

4. A method as claimed in claim 2 or claim 3 and including the further step of displaying on the visual display unit a visual representation of the structure of the body derived from said representation of the spatial distribution of the structure of the body.

5. A method as claimed in claim 2 in which the representation of the body surrounding the liquid flow is superimposed on the representation of the liquid flow in a plane being displayed.

6. A method as claimed in claim 1 and in which the step of generating a representation of the spatial distribution of the structure of the body includes the steps of programming a computer memory to accept information from a bit pad and drawing the shape of the structure on the bit pad.

7. A method as claimed in claim 1 and including the intermediate step of storing the output signals from the detection apparatus in a storage device whereby the adjusting of the output signals and the production of the representation of the flow path may be carried out at a later time.

8. A method as claimed in claim 1 and including the additional steps of pulsing the injection of the isotope label and gating signals coming from the detection apparatus in synchronism with the pulsing of the isotope label injection in order to produce a stroboscopic effect in the subsequently produced representation.

9. A method as claimed in claim 1 and wherein the isotope label is injected into the liquid path in a carrier fluid which has not detrimental reaction with the liquid.

10. A method as claimed in claim 1 in which the body is a gas turbine engine.

11. A method as claimed in claim 1 in which said attenuating effect information is produced by summing the codes of locations within said body through which said radiation passes, and further calculating therefrom an average attenuation that would be experienced by said radiation passing through said locations.

12. A method as claimed in claim 1, further comprising the step of rejecting the contribution of detector output signals which do not represent viable radiation directions.

13. A method as claimed in claim 12 in which said rejection step comprises the step of detecting whether a given output signal represents a direction of radiation passing through said liquid flow, and, if not, assigning zero values to the codes for the locations within the body through which the radiation represented by said given detector output signal passes.

14. A method of reproducing a representation of the flow path of a liquid flowing inside a hollow inorganic body comprising the steps of:

injecting into the liquid a quantity of a position emitting radioactive isotope label which has no detrimental reaction with the liquid or body structure;

detecting radiation emitted due to the annihilation of electrons by the positrons emitted by the isotope label, as it is carried with the liquid along the liquid flow path, by fixed positron cameras utilizing multi-wire proportional counters located outside the body and which produce output signals indicative of detected radiation, including attenuated radiation, for producing a first representation indicative of the flow of the liquid;

generating, by means of a computer, a second representation indicative of the spatial distribution of the structure of the body which surrounds the liquid flow and of the materials from which each major part of it is constructed, the second representation including a plurality of codes representing the differing attenuating properties at a plurality of locations within the body;

producing from said second representation attenuating effect information relating to the attenuation of the radiation as it passes through locations having differing attenuating properties;

generating attenuation compensation factors from the attenuating effect information; and combining said camera output signals with said attenuation compensation factors to produce a plurality of tomograms through selected planes of the body to represent the distribution of the isotope in the liquid within the body.

15. An apparatus for reproducing a representation of the flow path of a liquid flowing inside a hollow inorganic body comprising:
- a source of a positron emitting radioactive isotope label which has no detrimental reaction with the liquid or the inorganic body structure;
- means for injecting into the liquid a quantity of the radioactive isotope label;
- fixed detector apparatuses positioned at locations outside the inorganic body for detecting radiation emitted due to the annihilation of electrons by the positrons emitted by the isotope label, as it is carried with the liquid along the liquid flow path, and producing output signals responsive to the detected radiation, including attenuated radiation for producing a first representation indicative of the flow of the liquid;
- means for generating a second representation indicative of the spatial distribution of the structure of the inorganic body which surrounds the liquid flow and of the materials from which each major part of it is constructed, the second representation including a plurality of codes representing the differing attenuating properties at a plurality of locations within the inorganic body;
- means for producing from the second representation attenuating effect information relating to the attenuation of the radiation as it passes through locations having differing attenuating properties;
- means for generating attenuation compensation factors from the attenuating effect information; and
- means for combining said detector output signals with said attenuation compensation factors to produce adjusted output signals representing the flow path of the liquid corrected for the attenuating effects of the materials of which the inorganic body is constructed.

16. Apparatus as claimed in claim 15 and in which the isotope source is an isotope generator.

17. Apparatus as claimed in claim 15 in which the detectors are positron cameras utilising multi-wire proportional counters.

18. Apparatus as claimed in claim 15 in which said means for producing attenuating effect information comprises means for summing the codes of locations within said body through which said radiation passes, and means for further calculating therefrom an average attenuation that would be experienced by said radiation passing through said locations.

19. Apparatus as claimed in claim 15, further comprising means for superimposing a representation of the body surrounding the liquid flow onto a representation of the liquid flow in a plane to be displayed, and a visual display unit for displaying said superimposed representations.

20. Apparatus as claimed in claim 15, further comprising means for rejecting the contribution of detector output signals which do not represent viable radiation directions.

21. Apparatus as claimed in claim 20 in which said rejection means comprises means for detecting whether a given detector output signal represents a direction of radiation passing through said liquid flow, and, it not, assigning zero values to the codes for the locations within the body through which the radiation represented by said given detector output signal passes.

22. Apparatus as claimed in claim 15 in which the means for generating a representation of the spatial distribution of the structure of the body which surrounds the liquid flow and of the materials from which is is made, the means for producing the scattering effect information, the means for generating the attenuation compensation factors, and the means for combining the detector output signals with the attenuation compensation factors to produce adjusted output signals representing the flow path of the liquid comprise at least one suitably programmed computer.

* * * * *